July 5, 1966  R. A. KRAUS ET AL  3,259,175
HEATING AND COOLING SYSTEM FOR MOLDS
Filed June 15, 1964  2 Sheets-Sheet 1
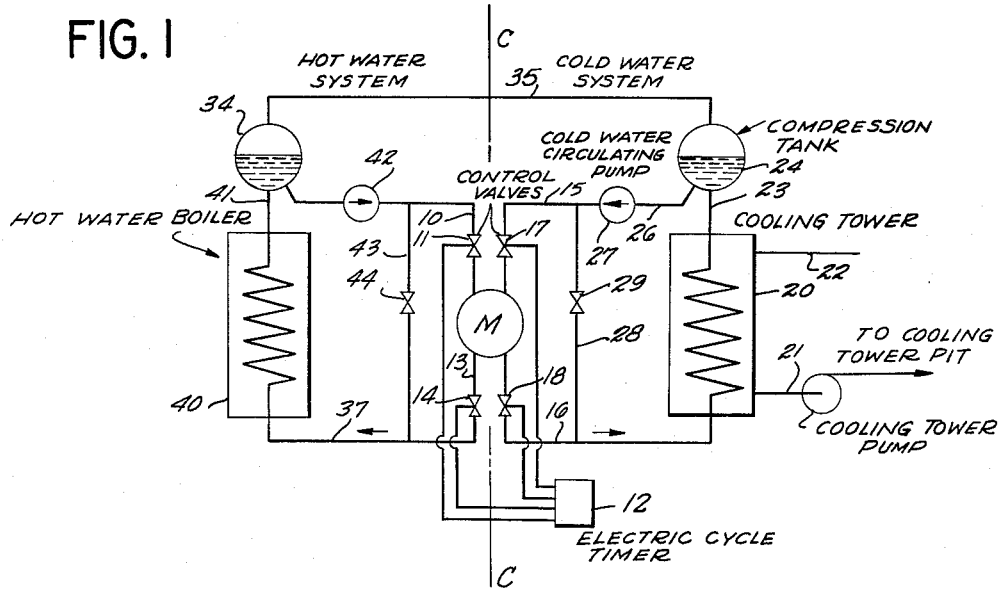
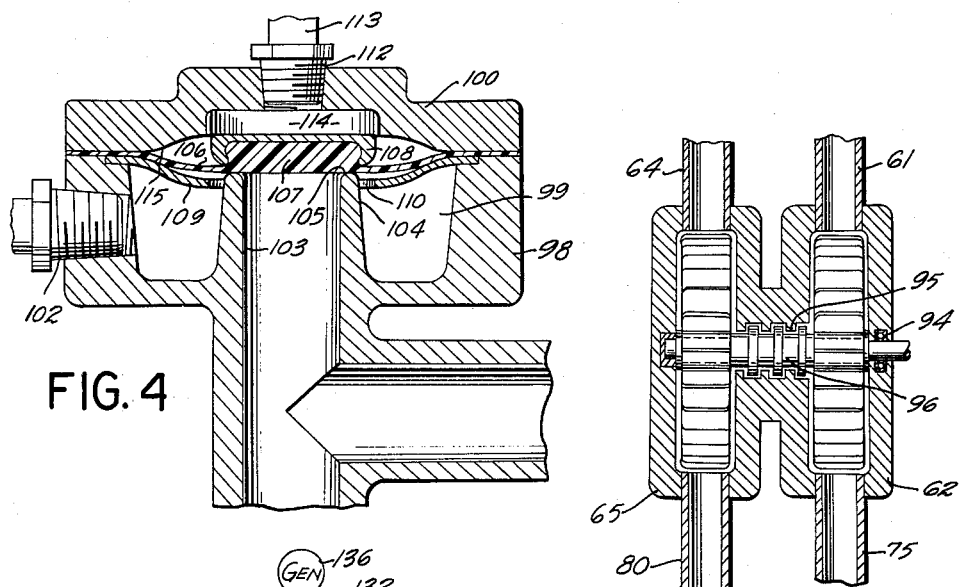
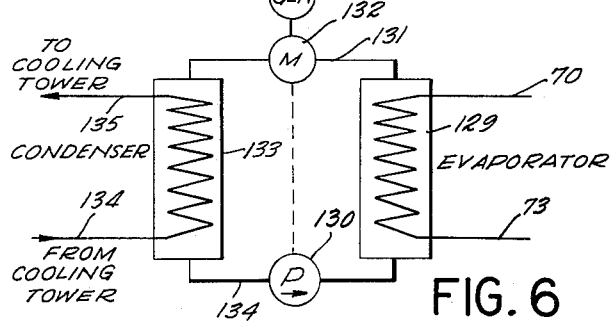
INVENTORS.
ROBERT A. KRAUS
EDMUND J. KRAUS
BY
ATTORNEYS

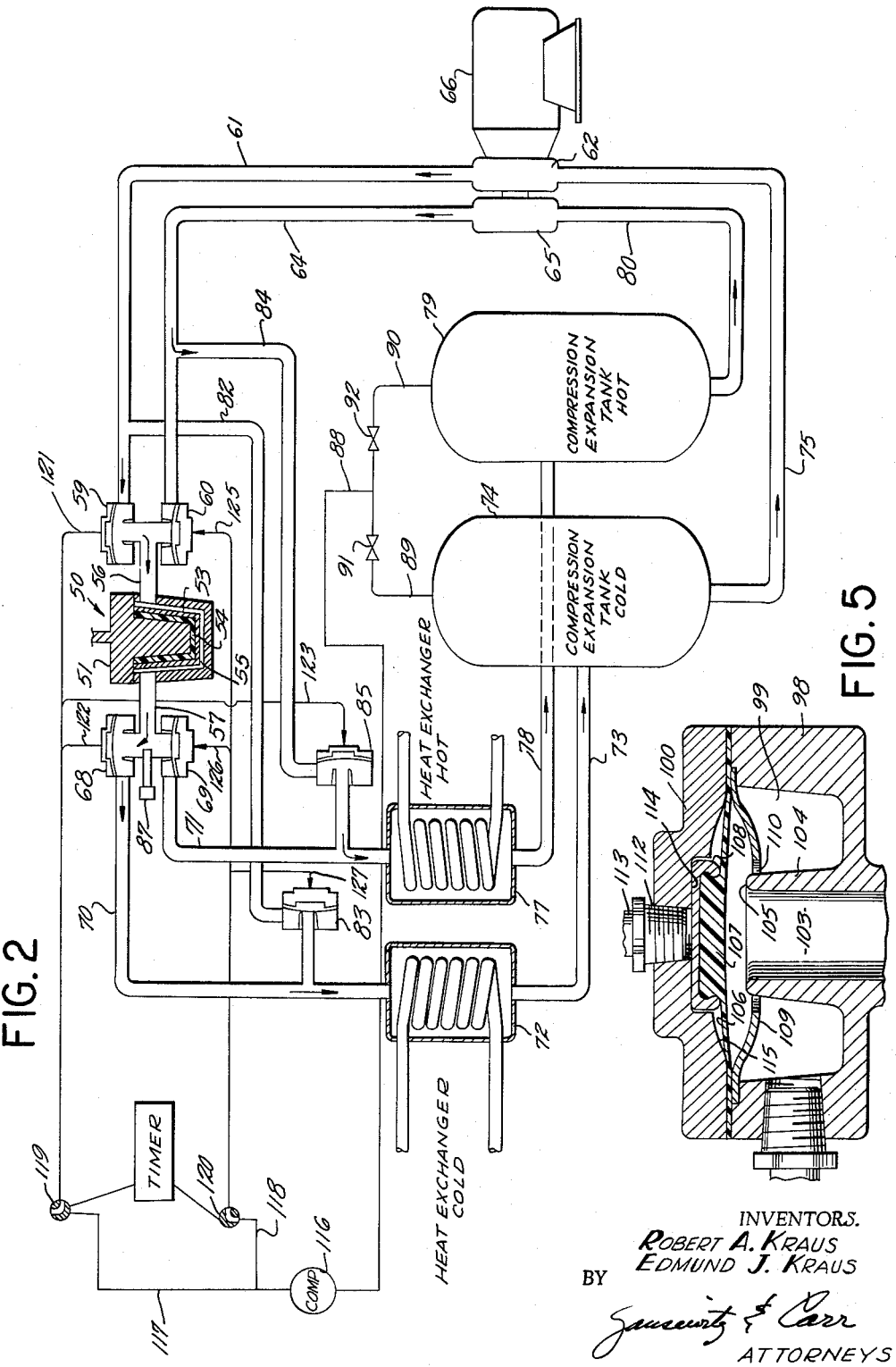

United States Patent Office 3,259,175
Patented July 5, 1966

3,259,175
HEATING AND COOLING SYSTEM FOR MOLDS
Robert A. Kraus and Edmund J. Kraus, both of 1401 Magnolia Ave., Monrovia, Calif.
Filed June 15, 1964, Ser. No. 375,263
14 Claims. (Cl. 165—12)

This application is a continuation-in-part of our copending application for Improved Method and Apparatus for Forming Thin Wall Articles of Manufacture from Expandable Fusible Plastic, Serial No. 22,165, filed April 14, 1960 and now Patent No. 3,167,811 granted February 2, 1965.

This invention pertains to an arrangement for heating and cooling, in particular to the rapid heating and cooling of molds.

Although not restricted to such purpose, the arrangement of this invention is particularly adapted to the heating and cooling of molds used in forming thin-walled plastic articles. Typically, these molds will be utilized to produce cups or other items made from fused expanded foam plastic pellets. The pellets used in making such products are of partially expanded plastic material, such as polystyrene, charged with an expansion agent, such as methyl chloride, butane, heptane or the like. When these beads are confined in a mold cavity and heated, they expand and adhere together to form a unitary article. Then it is necessary to cool the mold to terminate the expansion of the plastic and solidify the product obtained. Upon separation from the mold, the article is then ready for use.

Such a product not only is economical to produce but has desirable characteristics, such as low thermal conductivity, low water absorption, low density, lack of odor and absence of toxicity. Cups produced in this manner are employed as disposable items for containing hot and cold liquids, competitive with but superior in properties to the familiar paper cup.

In forming the fused foam plastic articles, normally the mold is constructed in two sections that include male and female elements which cooperate to define a cavity having the contour of the completed article. The plastic pellets are introduced into the mold cavity, whereupon the mold is heated sufficiently to expand the pellets and cause them to fuse together to form the completed item. Next, the mold must be cooled in order to terminate the expansion and solidify the plastic, following which the mold sections are separated and the finished article removed. In order to produce to plastic item at a low cost, it is necessary to complete the production cycle in the shortest possible period of time so that maximum production may be obtained from each mold. This means that the heating and cooling of the mold must be accomplished quite rapidly. As well as rapid cycling, the mold heating and cooling should involve as little equipment as possible, preferably uncomplicated and efficient so as to minimize production costs.

Conventionally, it has been the practice to utilize steam as the heating medium for the mold. Obviously, steam can be elevated to any temperature desired and is recognized as the accepted medium to use in use in effecting heat transfer to raise temperatures. However, this results in a serious disadvantage to the objectives of a rapid cycle and a low cost production of the article in the mold. This stems from the fact that with this type of system the temperature must be varied through a considerable range in a brief interval of time as the mold is alternately heated and chilled. Thus, after the mold has been cooled, it presents relatively cold surfaces in the jackets around the mold, which result in condensation of the steam as in enters and impinges upon these surfaces. Consequently, the steam initially entering the jacket around the mold will condense into water rather than entirely filling the passageways within the mold. There is an appreciable time interval, therefore where the steam is being converted back to water, and no material heat transfer is taking place because the steam will not give significant temperature rise to the mold until it entirely fills the jacket. Only after the surfaces of the jacket have been raised in temperature sufficiently to preclude condensation can the steam spread throughout the passageways and serve its purpose of elevating the temperature of the mold. As a result, valuable time is lost on each heating cycle. In addition to the condensate, often there will be water inside the heat transfer jacket of the mold where water has been used as the cooling medium. It is quite difficult to clear the jacket of all the cooling water before the steam enters so that a residue of water frequently remains. This left-over water will be elevated in temperature as the steam ultimately fills the jacket, and converted into steam. Heat is lost in this occurrence, resulting from the latent heat of vaporization of the water so converted into steam. It requires 974 B.t.u.'s per pound to convert this water into steam, during which time all the heat energy is expended in effecting the vaporization, and there is no change in temperature. Consequently, there not only is a heat loss but also a serious time delay from the vaporization within the mold jacket. In fact, inherently a steam system has an efficiency loss arising from the expenditure of energy in vaporizing the water with the attendant use of heat to overcome the latent heat of vaporization.

The present invention overcomes such difficulties, providing a system that will cycle rapidly between its hot and cold values with very little power loss, permitting production at a maximum rate. This is accomplished basically through the use of a pressurized liquid system for both the hot and the cold portions of the cycle. By utilizing a liquid and avoiding steam, the cycle speed is increased materially because there is no delay from condensation of steam at the outset of the heating portion of the cycle. Efficient use of heat is achieved with no loss in vaporizing the water. The system is pressurized so that the hot water or other liquid may be at a relatively high temperature and can effect a rapid temperature rise within the mold. Moreover, liquids as used in the system of this invention have a much higher film coefficient than a vapor such as steam. Consequently, the liquid can effect greater heat transfer than the vapor even when at a considerably lower temperature. The hot and cold water branches of the system are maintained at the same pressure so that changeover from one to the other is effected smoothly and rapidly. Also, this simplifies sealing problems at the pump. The valves for controlling the water flow into and out of the mold are located as closely as possible to the mold to minimize intermixing of the hot and cold water upon changeover from the hot cycle to the cold. These valves are special air-operated diaphragm units, which move rapidly to the closed position when subjected to pressure. They are opened automatically by the inlet water when the air pressure is removed. By being pneumatically operated, the valves provide an automatic pressure relief effect despite positive movement from the open to closed positions. In the event of water hammer in the system, the back pressure will open the valve to relieve the surge of the water hammer and prevent damage. The water hammer back pressure simply overcomes the pneumatic pressure that holds the valve closed so that this back pressure can be dissipated without harm.

An object of this invention is to provide a system for rapid and economical heating and cooling of a unit such as a mold.

Another object of this invention is to provide a heating and cooling system especially adapted for the manufacture of foam plastic articles.

A further object of this invention is to provide an improved valving arrangement for a heating and cooling system or the like.

An additional object of this invention is to provide a heating and cooling system of relatively simple design and of minimum complexity so that the system is economical to construct and operate.

These and other objects will become apparent from the following detailed description taken in connection with the accompanying drawings in which:

FIGURE 1 is a schematic view of the heating and cooling system of this invention;

FIGURE 2 is a schematic view similar to FIGURE 1 but of a modified version of the system;

FIGURE 3 is an enlarged axial sectional view of the pumps used in circulating the hot and cold water;

FIGURE 4 is an enlarged sectional view of one of the control valves, with the valve in the closed position;

FIGURE 5 is a fragmentary sectional view similar to FIGURE 4 but with the valve open; and FIGURE 6 is a schematic view illustrating the manner in which some of the heat may be recovered in the cooling system to generate power.

With reference to FIGURE 1, the system shown schematically utilizes hot water in a pressurized system as the heating means for raising the temperature of the mold. When forming an article, such as a cup, from expansible foam plastic beads, this increase in temperature causes the mold cavity to fill and beads to fuse together. After this, the mold is cooled to allow extraction of the molded cup, the cooling being effected by means of coolant water circulated through the fluid passages surrounding the cavity.

Various liquids may be circulated in the jacket around the mold to accomplish the heating and cooling. Water frequently is used in view of its obvious advantage of low cost. However, the vapor pressure of water increases at elevated temperatures when boiling is prevented, so that it is necessary for the system to withstand considerable pressure to keep the water from flashing into steam. Other liquids will permit the system to operate under less pressure. Oil is one such fluid, although certain measures must be taken to preclude the formation of carbon deposits from the oil when pressurized by air and maintained at an elevated temperature. Ethylene glycol also may be used at a relatively low vapor pressure. The system need not be pressurized if a eutetic mixture of diphenyl and diphenyl oxide is used, such as a heat transfer liquid marketed by The Dow Chemical Company, Midland, Michigan, under the trademark "Dowtherm." Either type A or type E "Dowtherm" may be used, the latter being intended primarily for particularly high temperature use.

As shown in FIGURE 1, hot water or other liquid is supplied from a closed hot water system to the mold apparatus, designated generally as M. Similarly, a cold water system is connected to the fluid inlet in order that both hot and cold water can be circulated selectively through the mold to raise or lower the temperature of the mold cavity at the proper point in the cycle of operation of the mold apparatus.

Thus, referring particularly to FIGURE 1, a hot water fluid inlet line 10 is connected to the fluid inlet port of the mold M. The hot water is connected to this port through suitable fittings and is valved by a control valve 11 of the type which can be electrically cycled by means of an electrical cycle timer 12 connected therewith. A hot water outlet line 13 is connected to the fluid outlet port at the appropriate fittings in the body of the mold apparatus. This hot water outlet line is also controlled by an electrically operated valve 14.

Similarly, a cold water line 15 is connected to the fluid inlet of the mold apparatus, and a cold water outlet line 16 is connected to the fluid outlet of the mold. The cold water lines are also valved by valves 17 and 18, respectively, which are connected to the electric cycle timer 12.

In FIGURE 1, the cold water system is shown to the right of the center line C for purposes of a schematic flow diagram, while the hot water system is shown to the left of the center line C. The cold water system includes a cooling tower (not shown) which is connected to a heat exchanger 20 through an outlet line 21 having a water pump therein and through an inlet line extending from the cooling tower to the heat exchanger designated as 22. The water system is closed such that water passing from the mold apparatus M through the cold water outlet line 16 when the valve 18 is opened will pass to the heat exchanger 20 where its temperature is lowered to approximately 120° for cooling purposes in the mold apparatus. The cooled water is passed from the heat exchanger through the cold water line 23 and into a compression tank 24, which maintains the cold water under pressure to create a pressurized water system. From the compression tank 24 the cold water inlet line 26 passes through a cold water circulating pump 27 which pumps the cooled water to the cold water inlet line 15 through the valve 17 when the valve 17 is opened at the proper time in the operating cycle. A bypass line 28 is provided with a bypass valve 29 for short circuiting the cooling water when necessary. Both the hot water system and the cold water system are maintained in a pressurized condition by means of the compression tanks 24 for the cold water system and 34 for the hot water system. These tanks are of the type well known to the art which are pressurized by air pressure conducted to the tanks through the air line 35.

Similarly, in the hot water system hot water is conducted from the mold apparatus through the fluid outlet into the hot water outlet line 13 and through the valve 14 to the hot water return line 37. The hot water return line 37 passes to the hot water boiler where its temperature is raised by passing through the hot water boiler 40. The hot water outlet line 41 leads from the boiler to the hot water compression tank 34 and thence from the tank through a hot water circulating pump 42 through the hot water inlet line 10 when the valve 11 is opened. A bypass line 43 is provided, being controlled by the bypass valve 44.

In the presently preferred embodiment, the hot water system supplies hot water to the fluid inlet of the mold through the hot water inlet line 10 at a temperature of approximately 310° and at a pressure of 100 pounds per square inch.

It can be seen, therefore, that basically this invention involves a system whereby a mold or other object can be heated and cooled by the alternate circulation of pressurized hot and cold water. Both the hot and cold systems contain heat exchangers to maintain the heat transfer liquid at the proper temperature, and include pressurizing tanks to give them substantially the same operating pressure. Control valves automatically cause first the hot and then the cold water to circulate through the mold, thereby raising and lowering the mold temperature. The system not connected to the mold continues to circulate through the bypass line provided. The heating and cooling of the mold is effected rapidly and efficiently without the use of steam as the heat transfer medium at the mold.

In the arrangement of FIGURE 2, there is illustrated a mold 50, such as is used in producing foam plastic cups from expansible beads. The mold 50 includes a male section 51 fitting within the female portion 52 to define a cavity 53 in which is formed a plastic cup 54. The sections 51 and 52 of the mold 50 may be separated to remove the plastic cup 54 upon completion. This type of cup may be made up of fused foam plastic beads which first must be elevated in temperature to cause expansion of them to fill the mold cavity and to fuse together to form a unitary article. Next, the mold must be cooled, terminating the expansion and solidifying the plastic of the completed article. Consequently, there is a passageway 55 internally of the mold used in transmitting the heating and cooling liquid. In most instances, a similar passageway will be provided in the male mold section 51 adjacent the cavity 53, but for purposes of simplicity this has been omitted from the illustration of FIGURE 2. An inlet line 56 provides ingress of liquid to the passageway 55, while the exhaust is through outlet line 57.

Upstream of the line 56 are two valves 59 and 60. The former controls the circulation of cold water from conduit 61, which is supplied by pump 62. The other valve 60 controls the hot water from inlet line 64, supplied by a pump 65. The pumps 62 and 65 are mounted side by side, and both driven by the same motor 66.

The exhaust line 57 from the mold 50 empties into valves 68 and 69 that, in turn, discharge into lines 70 and 71 to conduct the cold and hot liquids, respectively, away from the mold. The cold line 70 empties into a heat exchanger 72, where the water is cooled to a desired predetermined temperature. Passageway 73 conducts the cooled water from the heat exchanger 72 to a compression-expansion tank 74, from which conduit 75 extends to the cold water pump 62.

Similarly, the hot water line 71 passes through heat exchanger 77, where the water is raised in temperature, following which it is discharged through line 78 to the hot water compression-expansion tank 79. The outlet line 80 from the tank 79 extends to the inlet of pump 65.

Additional liquid lines are provided to bypass the mold 50 and its associated valve. Thus, bypass line 82 branches off the cold water line 61 upstream of the valve 59, and discharges into the cold water line 70 downstream of the mold 50 and the valve 68. The bypass line 82 is controlled by a valve 83.

The arrangement for the hot water system is basically the same with the conduit 84 extending from the hot water line 64 above the inlet valve 60, discharging into the hot water line 71 after the valve 69 and at the upstream side of heat exchanger 77. Flow through the conduit 84 is controlled by valve 85.

The hydraulic circuit of this system, therefore, provides for simultaneous flow through both the hot and cold water systems, with one of the systems circulating through the mold while the other bypasses the mold. In the position illustrated, for example, the cold water system is in operation for chilling the mold 50. Consequently, the valve 59 is open, allowing the line 61 to discharge into the jacket 55 of the mold, exhausting through the outlet 57 and the open valve 68 into the cold water line 70 that leads to the heat exchanger 72. The closed circuit is completed by the provision of the line 73 leading to the tank 74 and from there through the passageway 75 to the pump 62. With the valves 59 and 68 open to allow cold water to circulate through the mold 50, the valve 83 in the bypass 82 is closed to prevent flow of cold water around the mold.

For the hot water system, on the other hand, valve 60 is closed to prevent the hot water from entering the mold, while of course the valve 69 on the downstream side of the mold also is closed so that the cold water will not enter the hot water system. At the same time, the bypass valve 85 is open so that hot water circulates through the lines 84, 78, 80 and 64 during the time that the cold water effects the heat transfer at the mold 50. Thus, the hot water will be maintained at its elevated temperature by virtue of passing through the heat exchanger 77 even though it is not also passing through the mold 50.

When the cycle is changed, the positions of the valves are reversed so that the hot water circulates through the mold, while the cold water bypasses through the line 82. Again, both hot and cold water systems pass through their heat exchangers so that their temperature values are maintained.

In actual practice, the inlet valves 59 and 60 and the outlet valves 68 and 69 are located as close as practical to the mold. This is to minimize mixing of the hot water and the cold water. When the valves are given simultaneous operation, there is a small amount of water remaining in the mold and the inlet and outlet passages 56 and 57 that will go from one system to the other. In other words, if the mold has been circulating cold water through the passageway 55, the small volume of this cold liquid present in the mold when the valves are reversed will be allowed to enter the line 71 and mix in the hot water system. A similar consideration holds true for hot water in the jacket 55 when the valves are reversed. The actual volume of the jacket 55 is quite small so that it contributes very little in the way of intermixing and consequent energy loss when compared with the much greater volume of the overall system. With the valves positioned close to the mold 50, the inlet and outlet 56 and 57 also have minimal volume.

Although this loss of heat energy is so slight that for practical purposes normally it is ignored, it can be eliminated virtually by causing the timer to delay the operation of the valves 68 and 69 on the downstream side. By reversing their positions slightly after the time of operation of the inlet valves 59 and 60, they can allow for the small volume of water in the mold to enter its own system before the outlet valves are tripped.

A still further way of substantially eliminating any heat loss from intermixing is to provide a temperature probe 87 in the outlet 57 or other appropriate location, which will be sensitive to variation in temperature in the outlet from the mold and provide a signal to cause the actuation of the valves 68 and 69. The inlet valves 59 and 60 will remain operated by a timer even though the outlet valves are positioned as a result of a signal from the probe 87.

The tanks 74 and 79 are pressurized by air from a line 88 that supplies the conduits 89 and 90 leading to the tops of the two tanks. Valves 91 and 92 are included in the lines 89 and 90. The air from line 88, therefore, maintains the two tanks at the same pressure so that the hot and cold water systems are pressurized to the same extent. By including the twin pumps 62 and 65 driven by the same shaft from the motor 66, the pump head on both sides is the same. Consequently, changeover from one system to the other is smooth, and there is no tendency for flow from one side to the other. The tanks 74 and 79 serve the important purpose of pressurizing the systems so that the hot water can be kept below its heat of vaporization and will be precluded from flashing into steam. This permits the hot water system to be raised in temperature well above the boiling point at atmospheric pressure so that more rapid heat transfer can be effected at the mold 50. In a typical system for forming cups from foam plastic pellets, both water systems will be maintained at 60 p.s.i. with the hot water circuit at 275° F.

In addition, the tanks allow the separation of any air entrained with the water as the water passes through the tank. Moreover, they provide an expansion volume to compensate for the greater volume the water will occupy when its temperature becomes raised.

Maintenance of the system is minimized by placing the cold water pump 62 adjacent the motor 66, while the hot water side 65 is on the outside. The hot water is spaced from the motor, and so will not raise the motor temperature. The only positive seal required is the seal 94, which only must cope with a cold liquid. As a result, the seal 94 will have a much greater life than it would if it were called upon to seal the hot water. Because the hot and cold water systems are kept at the same pressure, there is virtually no tendency for flow to occur between the two systems. Consequently, at the pumps 62 and 65 only a labyrinth seal 95 need be employed on the shaft 96 between the impellers. The labyrinth seal 95 will virtually eliminate any flow between the hot and cold systems at the locality of the pumps where the equal pressures do not tend to generate fluid movement. By being a labyrinth seal, however, it will last indefinitely. It may be seen, therefore, that the arrangement of this invention is particularly maintenance-free because it necessitates only one positive seal at the pumps, and this seal is on the cold water side so that it has a very long life. Added to this is the fact that the motor is protected from the heat of the hot water system.

The arrangement of this invention can be operated satisfactorily with conventional valves appropriately constructed for automatic operation, such as where solenoid valves are utilized. Important advantages, however, are realized by use of the valves illustrated in FIGURES 4 and 5. The valve includes a body 98 inside of which is a chamber 99 closed by an end cap 100. An inlet fitting 102 in the side of the valve body 98 empties into the chamber 99. The valve outlet 103 communicates with a short cylindrical element 104 which projects upwardly in the chamber 99 and defines an annular rounded valve seat 105 at its distal end. Extending across the chamber 99 is a diaphragm 106 of a fluid-impervious flexible material, such as Teflon. The diaphragm 106 includes a thickened central portion 107 that extends into a metal reinforcing element 108. Beneath the diaphragm is a downwardly extending plate 109 having a central opening 110 that has its periphery spaced otuwardly of the cylindrical outlet element 104. The plate 109 at its inner portion is slightly below the valve seat 105.

Above the diaphragm 106 is a fitting 112 to which is connected an air line 113. A source of compressed air is connected to the line 113.

Therefore, in order to close the valve the pressurized air is admitted through the line 113 into the chamber 99 above the diaphragm 106. This air reacts against the diaphragm, forcing the diaphragm downwardly against the valve seat 105. This shuts off the flow between the chamber 99 and the outlet passage 103. Consequently, when the pressurized air is admitted into the valve above the diaphragm, the valve is closed. The plate 109 acts as a safety element to prevent damage to the diaphragm in the event that excessive pressure were applied from the air line 113.

Generally, the valve operates satisfactorily when the air pressure utilized in closing the valve is maintained 20 p.s.i. higher than the pressure of the water system, as applied in the compression-expansion tanks, plus the pump head pressure. A typical system will be pressurized at 60 p.s.i. in the tanks 74 and 79, while the pumps will produce a head of 20 p.s.i. For such a system, the air pressure for actuating the valves should be 100 p.s.i. When air is applied to the diaphragm in this manner, the valve is closed very rapidly, and as long as the air pressure is maintained flow is completely shut off as a result of the contact of the Teflon diaphragm against the valve seat 105.

Valve opening is accomplished merely by relieving the pressure in line 113. When this occurs, the water pressure of the system from the inlet fitting 102 forces the diaphragm upwardly to the position shown in FIGURE 5 so that it is remote from the valve seat 105, and the outlet passage is unobstructed. There is then a flow path from the chamber 99 to the opening 110 and the outlet 103. Thus, valve opening is accomplished automatically, simply by relieving the pressure above the diaphragm 106. While passageway 103 has been described as the valve outlet, this valve will operate just as satisfactorily if the flow is reversed and the outlet is at fitting 102.

Not only are these valves capable of positive operation and rapid action, but they provide the system with an important protection upon the occurrence of back pressure surges. In a system of this type where there is repeated opening and closing of the pressurized incompressible liquid, water hammer becomes a severe hazard. When meeting with the unyielding resistance of a conventional valve, the water hammer can be quite destructive. With the use of the valves of this arrangement, however, water hammer automatically opens the valve momentarily to relieve the back pressure surge. The water hammer will produce a back pressure exceeding the net pressure applied against the diaphragm 106 to close the valve, and so the water hammer will cause the diaphragm to lift away from the valve seat 105 so that a reverse passageway is provided through the valve. As soon as the surge dissipates, the air pressure again will close the diaphragm and shut off the valve. The water hammer cannot harm the valve because the central portions 107 and 108 of the diaphragm assembly will be forced back into the recess 114 in the cap 100, and the outer portions of the diaphragm will be supported by the wall 115 of the cap 100. Thus, water hammer becomes a harmless occurrence in the system of this invention.

A simple pneumatic system will provide for the operation of the water control valves of this invention, such a system being shown in FIGURE 2. In this arrangement, air compressor 116 discharges into air lines 117 and 118 in which are two-way valves 119 and 120. The line 117 includes a branch 121 extending to the valve 59 and section 122 connected to the valve 68, and a third portion 123 adjoins the valve 85. Similarly, the air line 118 connects through section 125 to the valve 60, through a line 126 to valve 69 and by conduit 127 to valve 83. With the valves 119 and 120 positioned as illustrated in FIGURE 2, there is communication between the compressor 116 and the lines leading to the valves 60, 69 and 83. Consequently, the inlet and outlet valves for the hot water system at the mold are closed, as well as the bypass valve in the cold water system. The valve 119, on the other hand, is vented to the atmosphere, thereby relieving the pressure in the valves, 59, 68 and 85. Thus, the water pressure in the system opens these valves so that the cold water can flow through the mold and the hot water can bypass through the valve 85. Reversal of the valves causes the switchover from the hot to the cold system. The valves 119 and 120 may be controlled through a timer 128.

Energy conservation can be realized if, in place of the heat exchanger 72 in the cold water system, a refrigeration system is employed such as shown in FIGURE 6. By this arrangement, the heat exchanger 72 is replaced by an evaporator 129, which serves the purpose of lowering the temperature of the water passing through it from the line 90 to the line 73. Refrigerant is pumped through the evaporator by the pump 130, being vaporized in the evaporator and conducted from the evaporator through line 131, where it passes through a motor 132. This may be, for example, a turbine. Following the unit 132, the refrigerant passes through a condenser 133 which, through line 134, returns it in liquefied form to the pump 30. The condenser is cooled by water that may enter the condenser from a line 135 leading from the cooling tower, while a return line 136 directs the water back to the cooling tower. The motor 132 is utilized in driving the pump 130 and will provide an excess of power to also rotate a generator 136. The only power loss of any consequence then is in the heat loss in the cooling tower. This minimizes the loss of energy in cooling the water of the cold water system.

The foregoing detailed description is to be clearly understood as given by way of illustration and example only, the spirit and scope of this invention being limited solely by the appended claims.

We claim:

1. In combination with a device to be heated and cooled, said device having a passageway therethrough, an arrangement for heating and cooling said device comprising a first hydraulic system, a second hydraulic system, means for selectively connecting said systems to said passageway, a bypass in each of said systems for bypassing said passageway, said means for selectively connecting said systems to said passageway including valve means for alternately and individually connecting said systems to said passageway and preventing flow through the bypass of the system so connected to said passageway while simultaneously connecting the other of said systems to the bypass of said other system and preventing flow from said other system through said passageway,
a liquid material,
 said material being pressed in both of said systems,
pump means for continuously circulating said fluid in said systems at substantially equal pressure heads in said systems,
means for heating said liquid material in one of said systems,
means for cooling said liquid material in the other of said systems, and means for simultaneously pressurizing said liquid material in both of said systems to substantially equal pressure sufficient to prevent vaporization of said liquid material,
 whereby said liquid material in said passageway causes heating and cooling of said device.

2. In combination with a mold having a cavity and a coolant jacket around said cavity, a heating and cooling arrangement for said mold comprising
a first closed hydraulic circuit,
a second closed hydraulic circuit,
means connecting said circuits with said jacket,
a bypass for each of said systems around said jacket, valve means for selectively permitting flow from said circuits individually through said jacket, and flow simultaneously through the bypass of the circuit not so connected to said jacket,
a liquid,
 said liquid being in each of said circuits,
means for heating said liquid in said first circuit,
means for cooling said liquid in said second circuit,
and pump means for circulating said liquid in said circuits at substantially equal pressure heads.

3. In combination with a mold having a cavity and a coolant jacket around said cavity, a heating and cooling arrangement for said mold comprising
a first closed hydraulic circuit,
a second closed hydraulic circuit,
means connecting said circuits with said jacket,
valve means for selectively permitting flow from said circuits individually through said jacket,
a liquid,
said liquid being in each of said circuits,
means for heating said liquid in said first circuit,
means for cooling said liquid in said second circuit,
pump means for simultaneously circulating said liquid in said circuits at substantially equal pressure heads,
a bypass around said jacket for each of said circuits, said valve means including means for causing said liquid to flow through the bypass of the circuit not connected to said jacket so that there is continuous circulation of said liquid in said circuits, and pressurizing means for maintaining said liquid at substantially equal predetermined pressures in said circuits greater than ambient pressure and sufficient to prevent said liquid from vaporizing.

4. A device as recited in claim 3 in which said valve means is automatically openable upon occurrence of back pressure of predetermined magnitude in said circuits
 for permitting harmless dissipation of said back pressure.

5. In combination with a mold having a cavity and a coolant jacket around said cavity, an arrangement for heating and cooling said mold comprising
a first closed hydraulic circuit,
a second closed hydraulic circuit,
a liquid material,
 said liquid material being present in said first and said second circuits,
an inlet to said jacket,
an outlet from said jacket,
 both of said circuits being connected to said inlet and to said outlet,
an inlet valve upstream of said inlet to said jacket in either of said circuits,
an outlet valve downstream of said outlet from said jacket in either of said circuits,
 said valves being selectively operable for causing said circuits selectively and individually to be connected to said jacket,
a bypass around said jacket in either of said circuits,
a valve in either of said bypasses,
 said valves being operable to permit said liquid material to bypass said jacket in one of said circuits when the other of said circuits is transmitting liquid through said jacket,
means for heating the fluid in said first circuit,
means for cooling the fluid in said second circuit,
pressurizing means for maintaining said circuits at predetermined substantially equal pressures
 sufficiently great to prevent vaporization of said liquid in said first circuit,
pump means in either of said circuits
 producing equal heads in said circuits for causing flow of said liquid material through said circuits, and means for causing said operation of said valves for alternately connecting said circuits to said jacket with the circuit not so connected to said jacket being connected to the bypass thereof so that said liquid material continuously circulates in both of said circuits.

6. A device as recited in claim 5 in which for pressurizing said circuits there is provided in each of said circuits a tank, and a source of pressurized air connected to the upper portion of each of said tanks for raising the pressure therein.

7. A device as recited in claim 5 in which each of said valves includes
a diaphragm,
a seat engageable by said diaphragm for closing the valve,
and pneumatic means
 for exerting pressure on one side of said diaphragm to urge said diaphragm toward said seat and holding said valve in said closed position,
 said pneumatic means being yieldable upon occurrence of a back pressure surge on the opposite side of said diaphragm.

8. A device as recited in claim 5 including automatic means for operating said valves, said automatic means opening said outlet valves subsequent in time to the opening of said inlet valves for allowing said liquid in said jacket to pass into the circuit at its temperature upon changeover in connection to said jacket from one circuit to the other.

9. A device as recited in claim 8 in which said automatic means includes a temperature-sensitive probe at said outlet from said jacket for causing said outlet valves to operate upon a temperature change in said outlet.

10. A device as recited in claim 5 in which said pump means includes
a housing and an impeller in either of said circuits,
and a drive motor means having a power take-off shaft,
 both of said impellers being driven by said shaft and rotated thereby at the same speed, whereby the pump head in said circuits is the same.

11. A device as recited in claim 10 in which
said pump housings are in adjacency,
said pump housing of said second circuit is adjacent said drive motor means,
and said shaft between said housings is sealed by a labyrinth seal.

12. In combination with a mold for manufacturing an article of foam plastic material, said mold having a cavity for receiving plastic material to be formed into such an article, and having a passageway adjacent said cavity, said passageway having an inlet and an outlet, a heating and cooling arrangement for said mold comprising
a first closed hydraulic circuit,
a second closed hydraulic circuit,
a liquid heat transfer material,
   said material being present in both of said circuits,
a pump in either of said circuits for circulating said liquid material therethrough,
   said pumps producing substantially equal pressure heads,
   said first and second circuits being connected to said inlet to said passageway and to said outlet therefrom such that said passageway is series connected in both of said systems,
a first valve in either of said circuits upstream and immediately adjacent said inlet,
a second valve in either of said circuits downstream and immediately adjacent said outlet,
   whereby said circuits can be selectively and individually arranged to transmit said liquid material through said passageway,
a heat exchanger in either of said circuits downstream of said second valve thereof,
   said heat exchanger in said first system including means to extract heat from said liquid material and said heat exchanger in said second system including means to add heat to said liquid material therein,
      whereby said first circuit when connected to said passageway removes heat from said mold and said second system when connected to said passageway adds heat to said mold,
a compressor-expansion tank in either of said systems downstream of said heat exchanger thereof,
   said tanks including means to pressurize said liquid material in said first and second circuits to substantially equal values,
   each of said circuits having a bypass line extending from a location upstream of said first valve thereof to a location intermediate said second valve thereof and said heat exchanger,
and a valve in either of said bypass lines for allowing said liquid material in one of said circuits to bypass said mold and continue circulating while said liquid material in the other of said circuits is passing through said passageway.

13. A device as recited in claim 12 in which
said liquid material is water,
and each of said compression-expansion tanks includes
   a lower portion for receiving said liquid material and an upper portion defining an air space into which said liquid material can expand upon increase in temperature thereof,
and including a source of pressurized air connected to said tank above the water therein
   for increasing the pressure of said water and preventing vaporization thereof for maintaining said water in a liquid condition.

14. A device as recited in claim 12 in which
each of said valves includes a closure element movable between
   an open position for permitting liquid flow and a closed position for precluding flow of said liquid,
      said closure elements when in said closed position being yieldable to a back pressure surge to move to said open position for precluding damage from such a surge.

References Cited by the Examiner

UNITED STATES PATENTS

| | | | |
|---|---|---|---|
| 2,069,418 | 2/1937 | Otto | 165—16 |
| 2,357,706 | 9/1944 | Toepperwein | 165—2 |
| 2,471,538 | 5/1949 | Oaks | 165—24 |
| 2,521,847 | 9/1950 | Harr | 165—61 |
| 2,773,284 | 12/1956 | Kelly | 18—30 |
| 2,951,260 | 9/1960 | Harrison et al. | 264—53 X |
| 2,915,298 | 12/1959 | Hamlin et al. | 165—27 |
| 2,951,260 | 9/1960 | Harrison et al. | 264—53 X |
| 2,984,460 | 5/1961 | Gardner et al. | 165—50 |
| 3,103,342 | 9/1963 | Boteler | 251—331 |
| 3,130,954 | 4/1964 | McFarland | 251—331 |
| 3,143,167 | 8/1964 | Vieth | 165—27 |

FOREIGN PATENTS 392,404   5/1933   Great Britain.

ROBERT A. O'LEARY, *Primary Examiner.*

MICHAEL V. BRINDISI, CHARLES SUKALO,
*Examiners.*

J. H. FLINT, *Assistant Examiner.*

UNITED STATES PATENT OFFICE
CERTIFICATE OF CORRECTION

Patent No. 3,259,175                                July 5, 1966

Robert A. Kraus et al.

It is hereby certified that error appears in the above numbered patent requiring correction and that the said Letters Patent should read as corrected below.

Column 9, line 12, for "pressed" read -- present --.

Signed and sealed this 5th day of September 1967.

(SEAL)
Attest:

ERNEST W. SWIDER                                EDWARD J. BRENNER
Attesting Officer                                     Commissioner of Patents